Figure 1:
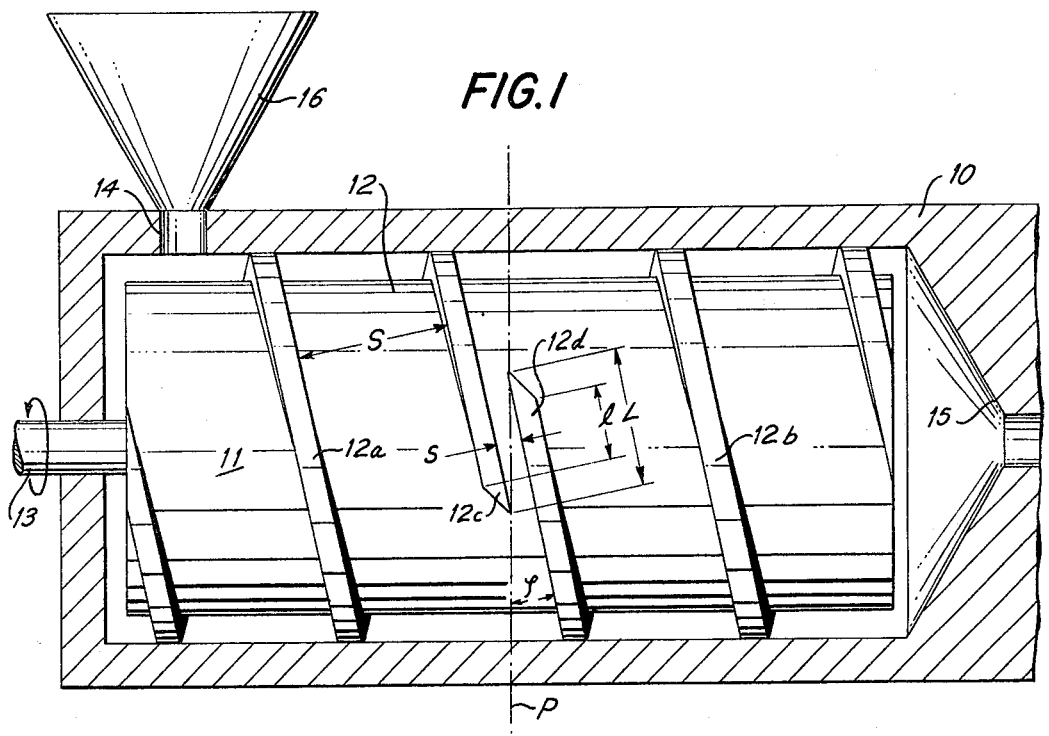

United States Patent Office 3,273,201
Patented Sept. 20, 1966

3,273,201
FEED SCREW FOR EXTRUSION PRESS
Fritz Reifenhäuser, Troisdorf, Bezirk Cologne, Germany, assignor to Firma Reifenhäuser K.G., Troisdorf, Bezirk Cologne, Germany, a corporation of Germany
Filed June 28, 1965, Ser. No. 467,439
Claims priority, application Germany, Mar. 18, 1965, R 40,142
6 Claims. (Cl. 18—12)

My present invention relates to a feed screw designed to advance a plastified resinous material from an inlet to an outlet or nozzle of an extrusion press.

Conventional feed screws of this type, disposed singly or in groups in a generally cylindrical extruder housing, have external helical threads serving to masticate the material while delivering it through the extrusion nozzle. Even with screws of multiple threads, however, it is unavoidable that certain parts of the material are worked more thoroughly than others by reason of their proximity to the forwardly facing flanks of the rotating thread along which they advance against the viscous drag of the fluid mass. Portions of material initially remote from these leading edges or flanks tend to lag behind and are also subject to less vigorous agitation.

An object of this invention is to provide an improved feed screw for the purpose set forth which avoids such stratification and insures thorough mastication of a plastified mass and substantially uniform movement thereof toward an extrusion nozzle.

This object is realized, in accordance with my present invention, by a subdivision of the thread or threads of a feed screw into a plurality of peripherally offset sections with spacedly overlapping ends, the latter extending at least to and preferably through a common plane transverse to the axis of the substantially cylindrical screw body. This overlap insures that the discontinuous thread sections follow one another without axial separation so that there will be no point along the periphery of the screw where a portion of the moldable mass could remain stationary without being swept along by the leading edge of the thread.

The spacing of the overlapping ends of successive thread sections represents, advantageously, but a small fraction of the spacing of adjacent turns of the thread on either side of the aforementioned transverse plane. Thus, two overlapping ends define a narrow gap bounded by the leading edge of the inlet-side thread section and the trailing edge of the nozzle-side thread section through which the advancing particles are transferred from a location adjacent the leading edge of the former to a location next to the trailing edge of the latter. In order to prevent any congestion in the region of overlap, the cross-section of this gap should be constant, or divergent in the direction of advance; the latter situation will exist when the pitch angle of the inlet-side thread section is larger than that of the nozzle-side thread section.

Figure 2:
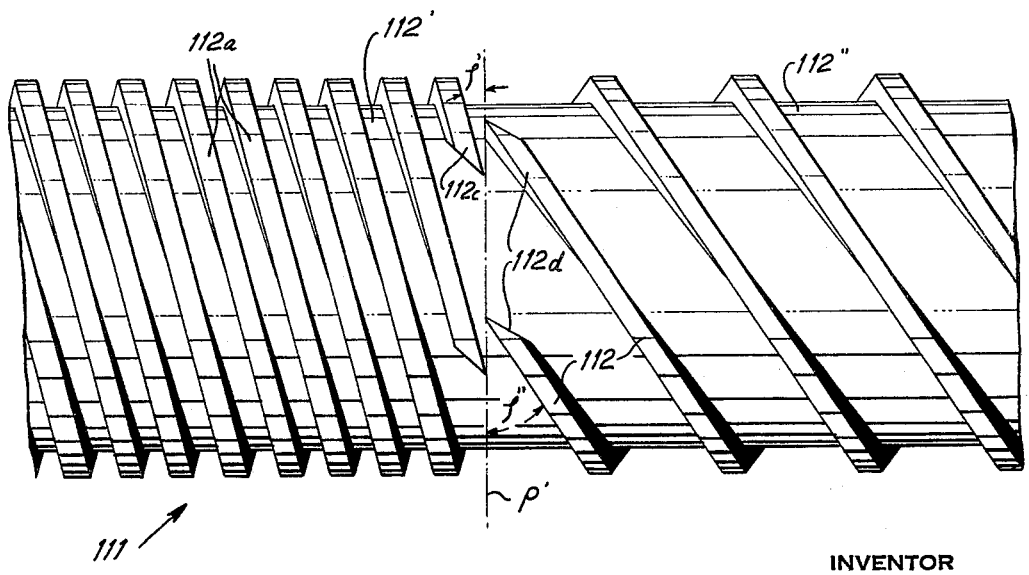

The invention will be described hereinafter in greater detail, reference being made to the accompanying drawing in which:

FIG. 1 illustrates, in longitudinal section, an extruder housing containing a feed screw according to the invention; and FIG. 2 is an elevational view of a modified feed screw adapted to be used in the housing of FIG. 1.

The extruder shown in FIG. 1 comprises a generally cylindrical housing 10 having disposed therein a feed screw 11 with a projecting shaft 13 which is continuously rotated, in the direction of the arrow, by a drive motor or other power source not illustrated. Screw 11 has a cylindrical body 12 formed with an external helical thread which contacts the inner housing wall, this thread being axially subdivided into sections 12a and 12b with overlapping ends 12c and 12d. The spacing s of the overlapping ends, measured transversely to the turns of the thread, is substantially less than half the spacing S of adjacent turns. In order that the tips of ends 12c, 12d lie in a common transverse plane P, it is necessary that the minimum length $l$ satisfy the relationship $l = s \cdot \cot \varphi$ where $\varphi$ is the pitch angle of the thread. In the specific embodiment shown in FIG. 1, the actual length of overlap is somewhat greater than $l$ so that the two ends 12c, 12d extend not only to but through the plane P.

Housing 10 is shown provided with an inlet 14 for plastifiable resinous material, e.g. in granular form, at one end and with an extrusion nozzle 15 at the opposite end. The material introduced via a hopper 16 into the inlet 14 is thoroughly worked and leaves the nozzle 15 as a substantially homogeneous mass.

FIG. 2 illustrates a modified feed screw 111 consisting of two rigidly interconnected body portions 112', 112" with respective multiple thread sections 112a, 112b thereon. The overlapping ends 112c, 112d of these sections extend only to a common plane P', i.e. the plane of contact of the two body sections 112', 112". Furthermore, the thread sections 112a are shown to have a pitch angle $\varphi'$ which is somewhat greater than the pitch angle $\varphi''$ of thread sections 112b whereby the gaps formed between the overlapping ends 112c and 112d diverge in the direction of advance.

Naturally, feed screws according to my invention could also have more than two peripherally offset thread sections for even more thorough homogenization of the plastic material; the gaps between their overlapping ends may be of constant width as in FIG. 1, or divergent as in FIG. 2, and the number of interleaved threads on any one section of the screw body may also be varied at will. These and other modifications, readily apparent to persons skilled in the art, are intended to be embraced in the spirit and scope of the invention as defined in the appended claims.

I claim:

1. A feed screw for delivering plastified resinous material to the nozzle of an extrusion press, comprising a substantially cylindrical body provided with at least one external helicoidal thread, said thread being split longitudinally into a plurality of peripherally offset sections with spacedly overlapping ends, said overlapping ends extending at least to a common plane transverse to the axis of said body.

2. A feed screw as defined in claim 1 wherein the spacing of said overlapping ends is substantially less than half the spacing of adjacent turns of said thread on either side of said plane.

3. An extruder comprising a substantially cylindrical housing having at one end an inlet for plastifiable resinous material and at the other end an extrusion nozzle for said material; at least one feed screw in said housing extending from said inlet toward said nozzle, said feed screw comprising a substantially cylindrical body with at least one external helicoidal thread, said thread being split longitudinally into a plurality of peripherally offset sections with spacedly overlapping ends, said overlapping ends extending at least to a common plane transverse to the axis of said body; and means for rotating said feed screw in a sense to advance said resinous material from said inlet toward said nozzle.

4. An extruder as defined in claim 3 wherein the spacing of said overlapping ends is substantially less than half the spacing of adjacent turns of said thread on either side of said plane.

5. An extruder as defined in claim 4 wherein a thread section on the inlet side of said plane has a larger pitch angle than an immediately following thread section at the nozzle side of said plane whereby said overlapping ends define a gap diverging in the direction of advance of said material.

6. A feed screw for delivering plastified resinous material to the nozzle of an extrusion press, comprising a substantially cylindrical body provided with at least one external helicoidal thread, said thread being split longitudinally into a plurality of peripherally offset sections of substantially identical pitch angle $\varphi$ with spacedly overlapping ends separated by a distance $s$, the extent $l$ of the overlap satisfying the relationship $l \geqq s \cdot \cot \varphi$.

References Cited by the Examiner

UNITED STATES PATENTS

| 2,896,253 | 7/1959 | Mol | 18—12 |
| 3,160,916 | 12/1964 | Blakey | 18—12 |

FOREIGN PATENTS

| 1,142,059 | 1/1963 | Germany. |

WILLIAM J. STEPHENSON, *Primary Examiner.*